United States Patent [19]

Smith

[11] Patent Number: 4,535,546

[45] Date of Patent: Aug. 20, 1985

[54] LOCKSMITH TOOL APPARATUS FOR DETERMINING LENGTH OF LOCKING ELEMENTS IN LOCKS

[76] Inventor: Rodney D. Smith, 6550 N. 2nd Dr., Phoenix, Ariz. 85013

[21] Appl. No.: 583,679

[22] Filed: Feb. 27, 1984

[51] Int. Cl.³ .............................................. G01B 5/20
[52] U.S. Cl. ........................................ 33/540; 70/394
[58] Field of Search ................. 70/387, 394; 33/174 F

[56] References Cited

U.S. PATENT DOCUMENTS

| | | | |
|---|---|---|---|
| 1,175,819 | 3/1916 | Ross | 33/174 F |
| 3,452,562 | 7/1969 | Loveless | 70/394 |
| 3,827,151 | 8/1974 | Naill | 33/174 F |
| 4,300,416 | 11/1981 | Ross | 70/394 |
| 4,388,815 | 6/1983 | Lawler | 70/387 |
| 4,433,487 | 2/1984 | Roland | 33/174 F |

*Primary Examiner*—Robert I. Smith
*Attorney, Agent, or Firm*—H. Gordon Shields

[57] ABSTRACT

Locksmith tool apparatus determines the length of a locking element in a lock by engaging a locking element inside a lock and by moving the element to compress a compression spring to a known minimum length and by measuring the distance moved. By subtracting the distance the element is moved from known dimensions, the length of the locking element is determined.

18 Claims, 6 Drawing Figures

Fig-5

LOCKSMITH TOOL APPARATUS FOR DETERMINING LENGTH OF LOCKING ELEMENTS IN LOCKS

BACKGROUND OF THE INVENTION

1. Field of the Invention

This invention relates to locksmith apparatus and, more particularly, to locksmith apparatus for determining the length of lock pins for expediting the cutting of keys when a key to be duplicated is not available.

2. Description of the Prior Art

In the prior art, there are generally two ways of making keys for conventional locks. The first way is to simply duplicate a known key. That is, a key is known to work in a given lock, and the same type of a duplicate key is made from that key. Key cutting equipment designed to follow the configuration of an existing key is well known and understood. Thus, the key to be duplicated is secured in the key cutting apparatus, and by following the contours of the known key, a duplicate key is cut from a blank.

The second way of making a key is to know the "number" of a given key. The "number" of the key is a code indicating the length of the pins or lock elements in the lock. Knowing the number of a particular key, another key may be made by duplicating the length of the lock elements in terms of the depth of cuts on the key blank which correspond to the number of the lock.

For pin type locks, there are generally five or six pins or pin tumblers in discrete cylinders within a lock housing and within a rotatable lock cylinder or plug. There may be more pins, also, in some locks. The lengths of the pins vary. It is the variable length of the pins that determines the "number" of the lock. Since there are ten different lengths of pins, ranging in number from zero to nine, the "number" of a particular lock will have numbers in sequence which correspond to or which represent the lengths of the tumbler pins. The quantity of numbers will correspond to the quantitative number of discrete cylinders which receive the pins or tumbler pins. A locksmith will accordingly know the length of each pin by knowing the number of each pin and the sequence in which the numbers fall. The length of the pins varies inversely with the number. Thus, the number "0" pin is the longest, and the number "9" pin is the shortest.

As an example of lock numbering, a particular key may be numbered 20579. The "2" indicates that the first pin is a number 2 pin, which is of a particular length. The first cut on the key will correspond to the length of a number 2 pin. The "0" indicates that the next pin is a number 0 pin, which is the longest pin, and the corresponding cut on a key will be very shallow. The third number, the "5" in the key number, indicates that the third pin is a number 5 pin, and the depth of the cut will be about half way between the minimum depth of a zero cut and the maximum depth of a nine cut. The "7" indicates that the fourth pin is a number 7 pin, which is a relatively short pin. Finally, the "9" in the number indicates that the fifth pin is a number "9" pin, which is the shortest pin, and the depth of the cut in a key blank will be maximum depth.

There are individual or discrete cylinders within a lock housing which are aligned with discrete cylinders in the rotating cylinder or plug portion of the lock. Within the lock housing and within the cylinders are compression springs and driver pins. The housing cylinders and driver pins are of predetermined length, and each of the upper or driver pins is the same length. The compression springs bias the driver pins against the pin tumblers or lower pins. The compression springs will compress to a minimum, known length.

The lower pins or tumbler pins extend downwardly or outwardly under the bias of the compression springs and the upper or driver pins. They rest on what is referred to as the main key cut in the key way of the rotating cylindrical portion of a lock. When a key is inserted into a lock, the pin tumblers are biased upwardly or outwardly by the key. To enable a lock to be unlocked, the upper portion of each lower pin must be at the top or upper portion of the rotating cylinder, and the bottom portion of the driver pins must also be at that same location. The location is known as the shear point or break point of the lock.

If a key extends into a key way and does not bias the lower pins to the shear point, the lock cylinder will not rotate, and the lock will not unlock, or lock, whichever may be the case. However, when a key is extended into a key way which has the cuts on it corresponding, in depth, to the length of the various lower pins, the lower pins are raised to the shear point, and the rotating lock cylinder will accordingly rotate. If just one key cut is wrong, the lock cylinder will not rotate. Thus, all of the cuts on the key must be correct.

For any given lock, the distance between the main key cut and the top of the rotating lock cylinder is known, and the length or depth of each cylinder in the housing is also known. In addition, the length of the compression spring at maximum compression is known, and the length of each upper or driver pin is also known. By raising each lower pin so that the compression spring is compressed to its minimum length, and by measuring the distance each lower pin or tumbler pin moves during the compression of each spring, relatively simple mathematical calculations will give the length of each lower pin. The length of the lower pins is then correlated against a table which gives the pin numbers in terms of pin lengths. Thus, the "number" of a lock may be determined and a key may be made when the number of each pin is known.

Moreover, by compressing all springs, and by then allowing the springs to expand a known distance equal to the length of the discrete cylinders in a lock housing less the known length of the driver pins, the driver pins and lower pins will be at the shear point and the lock cylinder may then be rotated.

SUMMARY OF THE INVENTION

The invention described and claimed herein comprises apparatus for compressing springs in lock cylinders by moving lower pins and driver pins against the springs for unlocking locks and for calculating the length of a lower pin in a pin type lock by moving the lower pin until its compression spring is compressed to a minimum length. The distance measured in moving the lower pin is then correlated against known distances and the pin lengths to determine the number of a particular pin which corresponds to its length.

Among the objects of the present invention are the following:

To provide new and useful locksmith apparatus:

To provide new and useful apparatus for determining the length of a pin in a pin type lock;

To provide new and useful apparatus for measuring the distance required to compress a compression spring in a lock cylinder;

To provide new and useful apparatus for sequentially measuring the distance in lock cylinders that is required to move a lower pin, a driver pin, and a compression spring upwardly within locked cylinders until the compression spring is compressed to a minimum length; and To provide new and useful apparatus for compressing springs in discrete cylinders in a lock housing.

DESCRIPTION OF THE PREFERRED EMBODIMENT

Figure 1:
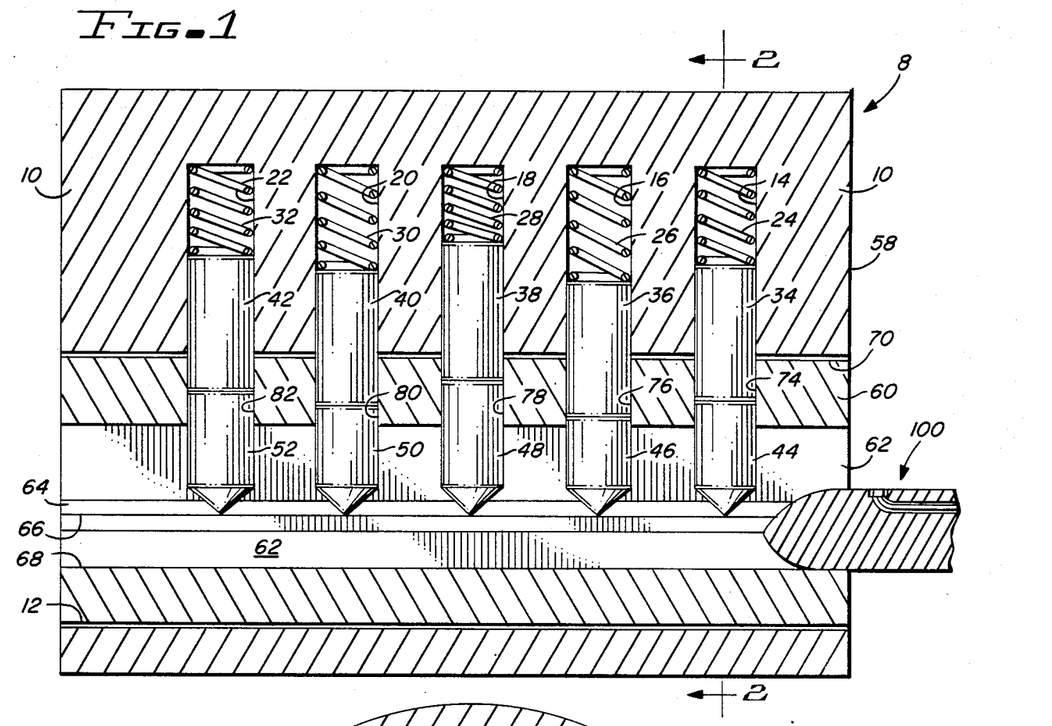
FIG. 1 is a view in partial section of a lock with the apparatus of the present invention shown in fragmentary view, being inserted into the lock.

FIG. 1 is a side view in partial section through a cylinder lock 8. The cylinder lock 8 includes a housing 10. In the lower part of the housing 10 is a cylindrical bore 12. Within the bore 12 is a rotating lock cylinder or plug 60. The lock cylinder or plug 60 includes a key way 62. A portion of a locksmith tool 100 of the present invention is shown extending partially into the key way 62.

Figure 2:
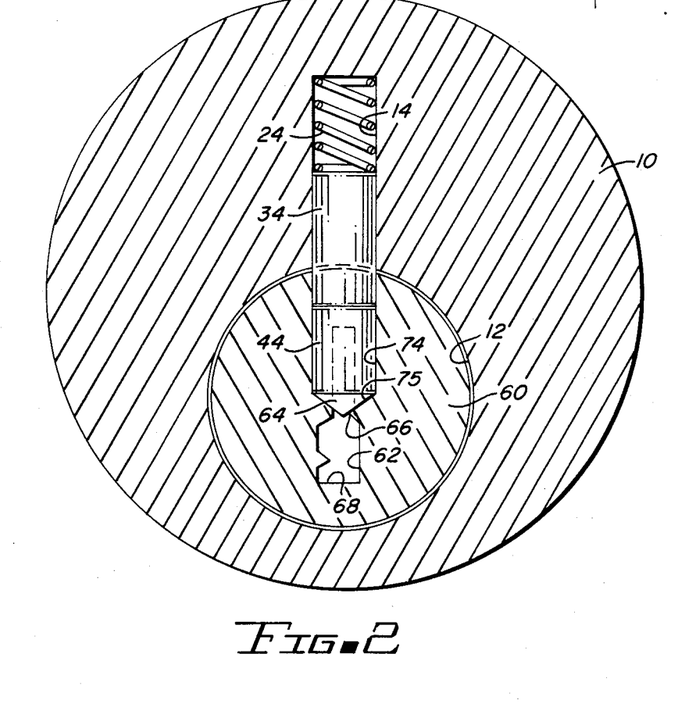
FIG. 2 is a view in partial section of the apparatus of FIG. 1, taken generally along line 2—2 of FIG. 1.
Figure 3:
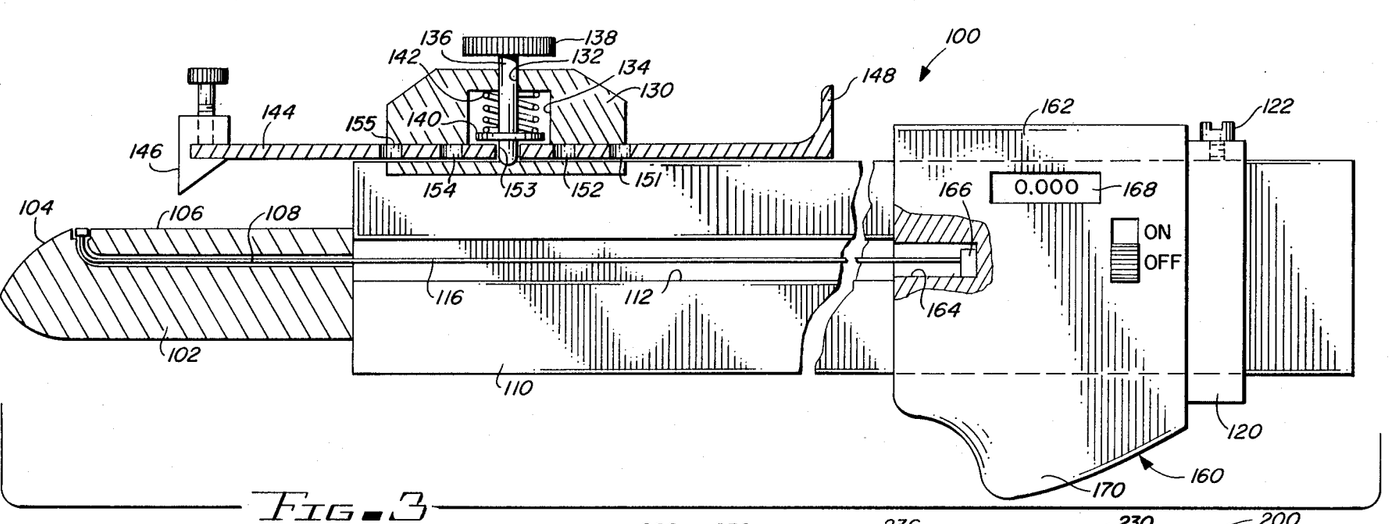
FIG. 3 is a side view, with portions in partial section, of the apparatus of the present invention.
Figure 4:
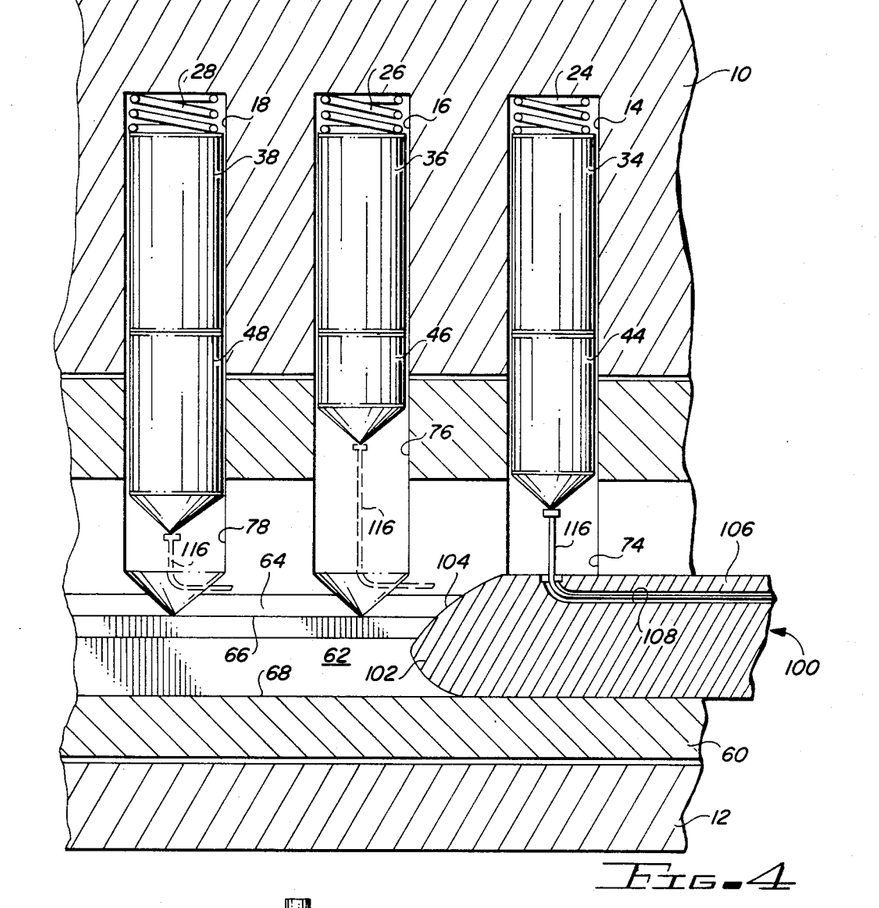
FIG. 4 is a view in partial section through a portion of the lock of FIG. 1, illustrating the apparatus of the present invention.
Figure 5:
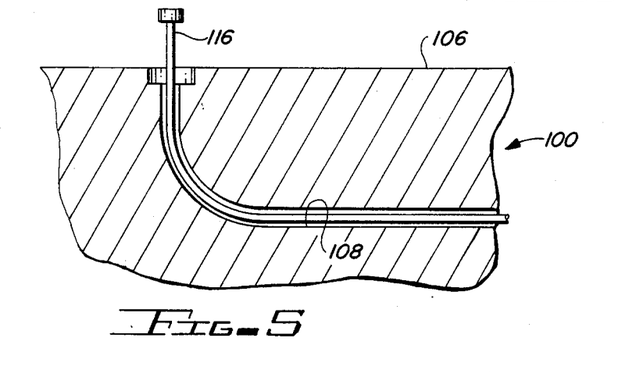
FIG. 5 is an enlarged fragmentary view in partial section of a portion of the apparatus of FIG. 4.

FIG. 2 is a view in partial section of the lock housing 10 and the rotating lock cylinder or plug 60 taken generally along line 2—2 of FIG. 1. FIG. 3 is a side view, with a portion in partial section, of the locksmith tool apparatus 100 of the present invention. FIG. 4 is a view in partial section of a portion of the lock housing 10 and the rotating lock cylinder or plug 60, with a portion of the locksmith tool apparatus 100 extending into the key way 62, and illustrating the operation of the tool 100. FIG. 5 is an enlarged fragmentary view of a portion of the tool 100. For the following discussion, reference will be made to FIGS. 1, 2, 3, 4, and 5.

The lock housing 10 of the lock 8 includes five pin cylinders. The pin cylinders are aligned and are spaced apart substantially equally in the housing 10 and the rotating lock cylinder or plug 60. The cylinders include a first cylinder 14, a second cylinder 16, a third cylinder 18, a fourth cylinder 20, and a fifth cylinder 22. Tumbler pin locks typically have five or six or more pin cylinders, with a pair of pins being disposed in each of the pin cylinders. The lock 8 illustrated and discussed herein is shown having five cylinders and accordingly five upper or driver pins and five lower or tumbler pins.

Within each cylinder is an upper or driver pin. The driver pins are biased downwardly by compression springs disposed in the upper portions of the respective pin cylinders. Cylinder 14 includes a compression spring 26 biasing downwardly against a driver pin 36. The cylinder 18 includes a compression spring 28 biasing downwardly against a driver pin 38. The cylinder 20 includes a compression spring 30 biasing downwardly against a driver pin 40. The cylinder 22 includes a compression spring 32 biasing downwardly against a driver pin 42.

The compression springs 24, 26, 28, 30, and 32 are all of substantially the same length in both their uncompressed and their compressed states. Similarly, the driver pins 34, 36, 38, 40, and 42 are of substantially the same length. Knowing the length of the driver pins and knowing the minimum compressed length of the compression springs are factors taken into consideration in the employment of the apparatus of the present invention.

Within the bore 12 of the housing 10 is the rotating lock cylinder or plug 60. The lock cylinder 60 includes a key way 62 which is aligned with the cylinders 14 . . . 22 of the housing 10. The key way 62 includes a sloping shoulder 64 which extends upwardly from a main key cut 66. The key way 62 terminates in a relatively flat bottom portion 68.

The rotating lock cylinder 60 also includes five pin cylinders. They include a cylinder 74, a cylinder 76, a cylinder 78, a cylinder 80, and a cylinder 82. The cylinders 74 . . . 82 are aligned with the cylinders 14 . . . 22, respectively. The cylinders 74 . . . 82 extend downwardly and terminate at the main key cut 66 in the key way 62. As shown in FIG. 1, the driver pins 34 . . . 42 extend downwardly from their respective cylinders 14 . . . 22 and into the cylinder 74 . . . 82, respectively. Beneath the driver pins 34 . . . 42 in the cylinders 74 . . . 82, are a plurality of lower or tumbler pins. They include, respectively, a lower, or tumbler pin 44, a lower or tumbler pin 46, a lower or tumbler pin 48, a lower or tumbler pin 50, and a lower or tumbler pin 52. It will be noted that the lower or tumbler pins 44 . . . 52 are not of uniform height. Rather, they are of different heights or lengths. The tumbler pins 44 . . . 52 are biased towards the main key cut of the key way by the action of the compression springs 24 . . . 32 through the driver pins 34 . . . 42, respectively. The tumber pins each include a generally conical bottom portion which matches the generally conical configuration of the lower portion of the respective cylinders 74 . . . 82. This is best shown in FIGS. 2 and 4. In FIG. 2, a lower conical portion 75 of the cylinder 74 is shown.

As indicated above, the cylinders 74 . . . 82 terminate at the main key cut 66. The sloping shoulder 64 of the key cut 62 is generally aligned with the conical portion of the respective cylinders. This is best shown in FIG. 2. The conical portion 75 of the cylinder 74 is aligned with the sloping shoulder 64 of the key cut 62. The lower conical portion of the pin 44 is disposed against the conical portion 75 and against the sloping shoulder 64. The tip of the conical portion of the lower pin 44 terminates at the main key cut 66, as do the conical portions of all of the other lower or tumbler pins 46 . . . 52.

The juncture of the upper portion of the rotating cylinder 60 and the upper portion of the bore 12 of the housing 10 defines a shear or break point 70. The shear point, for practical purposes, is defined at the juncture of the upper cylinders 14 . . . 22 and the lower cylinders 74 . . . 82. When a key is inserted into the key way 62, the configuration of the key must raise the tumbler pins so that the top of each tumbler pin, and thus the bottom of each driver pin, is at the shear point 70.

When all five of the driver pins 34 . . . 42 are disposed within their respective upper cylinders 14 . . . 22, with the bottoms of the driver pins 34 . . . 42 at the shear point 70, the rotating lock cylinder or plug 60 will turn in the bore 12 of the housing 10. The lock accordingly will open. However, if one or more of the lower or tumbler pins 44 . . . 52 is not at the shear point 70, then the cylinder 60 will not rotate within the housing 10. Thus, if any one or more of the tumbler pins 44 extends either too high, into any of the upper cylinders 14 . . . 22, or is too low, thus allowing any of the driver pins 34 . . . 42 to extend into the lower cylinders 74 . . . 82, the rotating cylinder or plug 60 will not rotate, and the lock will remain in the locked position. When all of the upper, driver pins and the lower, tumbler pins are aligned at the shear point 70, the rotating cylinder 60 may be turned, thus allowing the lock 8 to be unlocked.

Since each of the tumbler pins is or may be of a different length, a key having the right cuts to exactly raise the lower pins to the shear point is required to unlock and thus to rotate a lock cylinder. The apparatus 100 of the present invention allows a locksmith to determine the length of the lower, tumbler pins and therefore allows the locksmith to cut the key that will fit a particular lock. The measuring of the lower pins is accomplished by raising the tumbler pins, the driver pins, and the compression springs a maximum distance within the aligned cylinders until the compression springs are compressed to their minimum length. With the minimum length of the compression springs known beforehand, and with the length of the driver pins known beforehand, the length of the lower pins may be calculated when the distance required to compress the springs to their minimum length through the tumbler pins and driver pins is measured.

It will be understood that the overall length of each of the cylinders 14 . . . 22 is known. It will also be understood that the various dimensions of the key ways, from the main key cut upwardly, is also known, as is the thickness of the rotating lock cylinder 60 between the top of the key way 62 and the shear point 70. All of the critical dimensions of the lock 8 are known. By mathematical computation, knowing the distance that the tumbler pins are raised to compress the springs to a minimum, the length of the lower pins may be calculated.

For measuring the distance upwardly that the lower pins must be raised to fully compress the compression springs 24 . . . 32, the locksmith tool apparatus 100 is used. The locksmith tool apparatus 100 includes a key blade 102 which extends outwardly from a rectangularly configured handle 110. The key blade 102, as best shown in FIG. 4, is not the same height as a standard key. Rather, it is substantially less than the height of a regular key, or little more than about half the height of a regular key. The key blade 102 extends only slightly above the main key cut 66. Thus, in extending into the key way 62, the key blade 102 will raise each of the lower pins 44 . . . 52 only a relatively short distance before the lower pins come to rest on the blade 102.

The front of the key blade 102 is characterized by a sloping nose 104, substantially identical to that of a regular or normal ley. The sloping nose or surface 104 extends upwardly to a top surface 106. The sloping nose 104 defines a cam surface which contacts the lower, conical portion of each of the tumbler pins and moves them upwardly within their respective cylinders until they rest on the top surface 106 of the blade 102.

Within the key blade 102 is a longitudinally extending bore 108. The bore 108 extends generally parallel to the axial length of the key blade 102 from the handle 110.

Near the nose 104, the bore 108 turns and extends generally vertically upwardly to terminate in an opening at the top surface 106. The bore 108 is aligned with a channel or slot 112 in the handle 110. A wire 116 is disposed within the channel 112 and the bore 108. The wire 116 extends between the end of the bore 108 at the top surface 106 in the bore 108 and the channel 112 to an indicator block 160. The indicator block 160 is a generally rectangular block disposed on the blade 110 and is movable thereon. The indicator block 160 includes a housing 162. Within the housing 162 is a slot 164 which communicates with the channel or slot 112 in the blade 110. An anchor pin 166 is disposed in the slot 164 and one end of the wire 116 is anchored in the slot 164 to the pin 166.

A stop block 120 is disposed at one end of the handle 110. The stop block 120 is secured to the handle 110 by a set screw 122. The stop block 120 comprises a stop for the indicator block 160. The block 120 defines the rearmost extent of the travel of the indicator block 160.

An index block 130 is disposed at the forward end, and on the upper portion, of the handle 110. The index block is appropriately secured, as by a plurality of set screws (not shown) to the handle 110.

A bore 132 extends into the index block 130 from the top of the block and communicates with a counterbore 134. A lock pin 136 is disposed within the bore 132 and the counterbore 134. At one end of the lock pin 136 there is a handle 138. The handle 138 is in the form of a button. It allows the lock pin 136 to be lifted, as will be discussed below.

Within the counterbore 134 is a washer 140. The washer 140 is appropriately secured to the lower portion of the lock pin 136, but spaced apart from the tip of the pin 136. Between the washer 140 and the end of the counterbore 134 there is a compression spring 142. The spring 142 is disposed about the lock pin 136 and extends between the closed end of the counterbore 134, adjacent to the bore 132, and the washer 140 to bias the lock pin 136 downwardly.

Extending longitudinally through the index block 130, and generally on the top of the handle 110, is a blade 144. At one end of the blade 144 is an end block 146. At the opposite end of the blade 144 is an end tang or vertical protrusion 148. There are five holes or apertures extending through the blade 144. The holes or apertures are spaced apart from each other a distance to coincide with the longitudinal spacing between the pin cylinders of the lock apparatus 8. The holes or apertures include a hole or aperture 151, a hole or aperture 152, a hole or aperture 153, a hole or aperture 154, and a hole or aperture 155.

By raising the lock pin 136 by its button handle 138, the blade 144 may be moved longitudinally relative to the index block 130 and to the handle 110 and the key blade 102. When the hole or aperture 151 is disposed beneath the lock pin 136, the handle 138 is released, thus locking the pin 136 into the aperture 151. The apertures 151 . . . 155 are dimensioned so as to receive the lower end or tip of the lock pin 136, thus locking the blade 144 relative to the key blade 102 and the handle 110. In use, the blade 144 will first be positioned with the lock pin 136 disposed in the hole or aperture 151. As shown in FIG. 3, this will move the end block 146 forwardly relative to the key blade 102.

When the outer face of the end block 146 is disposed against the end face 58 of the lock 8, the key blade 102 will extend into the key slot 62 only a predetermined amount. The end block 146 act as a stop to limit the inward movement of the blade 102 into the key way 62. With the lock pin 136 in the first hole or aperture 151, the upper end of the bore 108 of the key blade 102 will be positioned beneath the first tumbler pin 44 and the aligned pin cylinders 74 and 14.

After the desired measurement and computation has been made for the tumbler pin 44 and the aligned cylinders 14 and 74, as will be discussed below, the blade 144 is moved rearwardly after the lock pin 136 is moved out of the hole 151. The blade 144 is then moved longitudinally until the second hole or aperture 152 is aligned with the lock pin 136. The end block 146 is thus moved rearwardly with resepct to the bore 108 and the key blade 102. The key blade 102 may then be moved inwardly until the end block 146 again contacts the face 58. When the end block 146 contacts the face 58, the upper end of the bore 108 is disposed beneath the second tumbler pin 46, and the aligned pin cylinders 16 and 76.

After the desired measurements and computations have again been accomplished for the tumbler pin 46, the lock pin 136 is again moved upwardly and the blade 144 moved rearwardly until the third hole or aperture 153 is aligned with the lock pin 136. With the pin 136 extending through the aperture 153, the end block 146 is again moved against the face 58 by moving the key blade 102 further into the key way 62. With the end block 146 disposed against the face 58, the open end of the bore 108 is now disposed beneath the third tumbler pin 48 and the aligned pin cylinders 18 and 78. The procedure is repeated until the measurements for all five of the tumbler pins have been made.

The blade 144 is thus used to index the key blade 102 relative to each of the tumbler pins in the lock 8. The distance or spacing between adjacent holes 151, 152, etc., is substantially the same as the center-to-center spacing of the several pin cylinders.

Returning again to FIG. 3, it has already been stated that the end of the wire 116 is secured within the indicator housing 162. Movement of the indicator housing 162 relative to the handle 110 and the key blade 102 moves the wire 116 in the channel 112 and in the slot 108. With the indicator housing 162 disposed rearwardly against the stop block 120, the end of the wire 116 is disposed at the juncture of the bore 108 and the upper surface 106 of the key blade 102. A forward movement of the indicator housing 162 accordingly moves the wire 116 upwardly or outwardly from the bore 108.

When the upper end of the bore 108 is disposed beneath any of the lower tumbler pins 44 . . . 52, movement of the indicator housing 162 and the wire 116 will cause the particular pin to move upwardly, thus biasing upwardly or pushing upwardly against a driver pin and its compression spring. The indicator 162 is moved on the handle 110 after the key blade 102 is disposed within the key way 62 to the desired depth, namely until the face of the end block 146 is disposed against the front face 58 of the lock 8. Movement of the indicator 162 longitudinally along the handle 110 moves the wire 116 in the channel or slot 112, the aligned bore 108, and then upwardly out of the bore 108 and against the lower conical portion of a particular pin.

In FIG. 4, the wire 116 is shown disposed against the tumbler pin 44. The pin 44 is shown moved upwardly in its cylinder 74 and against the upper, driver pin 34 in the pin cylinder 14. The compression spring 24 is shown compressed to its minimum length. The indicator housing 162 will no longer move forwardly, and the user of the apparatus 100 then looks at a liquid crystal display panel 168 on the side of the housing 162. The LCD display panel 168 shows the distance that the housing 162 has moved away from the block 120. The readout may be either in inches or millimeters, or both, as desired.

The LCD display 168 is connected to appropriate measuring circuitry (not shown but well known and understood in the art), and which indicates the longitudinal movement of the housing 162 relative to the handle 110. For example, a photo detector on the housing 162 may cooperate with spaced indicia on the handle 110 to measure the distance moved by the block 160. A calibrated wheel on the housing 162 moving on the handle 110 may be used, or other well known and understood measuring elements may also be used. The display panel 168 visually displays the actual measured distance the indicator block 160, and the housing 162, moves away from the stop block 120 on the handle 110. The stop block 120 is the zero or reference point for the block 160 and the wire 116. The measuring apparatus is zeroed out at the base point, which is defined at the juncture of the housing 162 and the stop block 120, or when the housing 162 is disposed against the stop block housing 120. Thereafter, the forward movement, in an axial direction, of the housing 162 on the handle 110 is measured in either inches or millimeters, as desired, and such movement is indicated in the LCD display panel 168.

After a particular reading has been made, the housing 162 is then moved rearwardly along the handle 110 until the housing 162 again abuts against the stop block 120. The rearward axial movement of the housing 162 along the handle 102 retracts the wire 116 into the bore 108 and the slot or groove 112.

Movement of the housing 162 along the handle 110 is accomplished by appropriate finger pressure against a lower finger stop 170 on the block 160 beneath the housing 162. The finger stop 170 includes appropriately curved surfaces against which a finger may be placed for movement of the block 160 in both longitudinal or axial directions along the handle 110.

After the indicator housing 162 of the block 160 is moved rearwardly along the handle 110 to retract the wire 116, the tool apparatus 100 may be removed from the key way 62 to disengage the key blade 102 from the key way 62. The index blade 144 may then be moved rearwardly to the next predetermined hole so that the upper end of the bore 108 is disposed beneath the next pin when the key blade 102 is inserted into the key way 62. With respect to FIG. 4, the next sequential tumbler pin is the pin 46 within the lower pin cylinder 76. As shown in FIG. 4, the wire 116 is shown in phantom pushing upwardly against the conical tip of the tumbler pin 46. The upper end of the pin 46 in turn moves upwardly against the upper, driver pin 46 to compress the spring 26 to its minimum length, as shown.

The process is then repeated with the key blade 102 next aligned with the lower pin 48 until the wire 116 (again shown in phantom) causes the compression spring 28 to compress to its minimum length by movement of the driver pin 38 and the tumbler pin 48.

It will be understood that the driver pins, which are of the same length, will move upwardly in the respective cylinders different lengths or amounts, as indicated on the LCD display panel 168, and in accordance with the different lengths of the lower, tumbler pins.

By knowing the various dimensions involved in the cylinders 14 . . . 22 in the housing 10, and the cylinders 74 . . . 82 in the lock cylinder or plug 60, the minimum compressed length of the springs 24 . . . 32, and the lengths of the driver pins 34 . . . 42, and knowing also the dimensions associated with the key blade 102, the key slot 62, and the plug 60, measurement of the distance moved by the tumbler pins, the driver pins, and the compression springs by the wire 116, the lengths of the several tumbler pins may be calculated. For practical purposes, tables may be prepared correlating the distance moved by the wire 116 with the length of the lower, tumbler pins for different types of locks.

As indicated above, the lower, tumbler pins are numbered from zero to nine, and each of the ten different pins is of a different length. There is typically about a fifteen thousandsh of an inch (0.015″) difference between the length of each pin, with the zero pin being the longest and the nine pin being the shortest. By correlating the vertical distance moved by the wire 116 with a number of a tumbler pin, the key number for a particular lock may be determined. An appropriate key blank may then be cut from knowing the number of the tumbler pin at each of the five pin locations.

Obviously, with tumbler pin lengths varying by fifteen thousandths of an inch, the margin of error of a few thousandths will be substantially immaterial with respect to the apparatus of the present invention. Thus, it does not matter whether the wire 116 contacts the lower tip of the conical portion of the tumbler pins directly or contacts an area of the conical portion adjacent to the tip.

Figure 6:
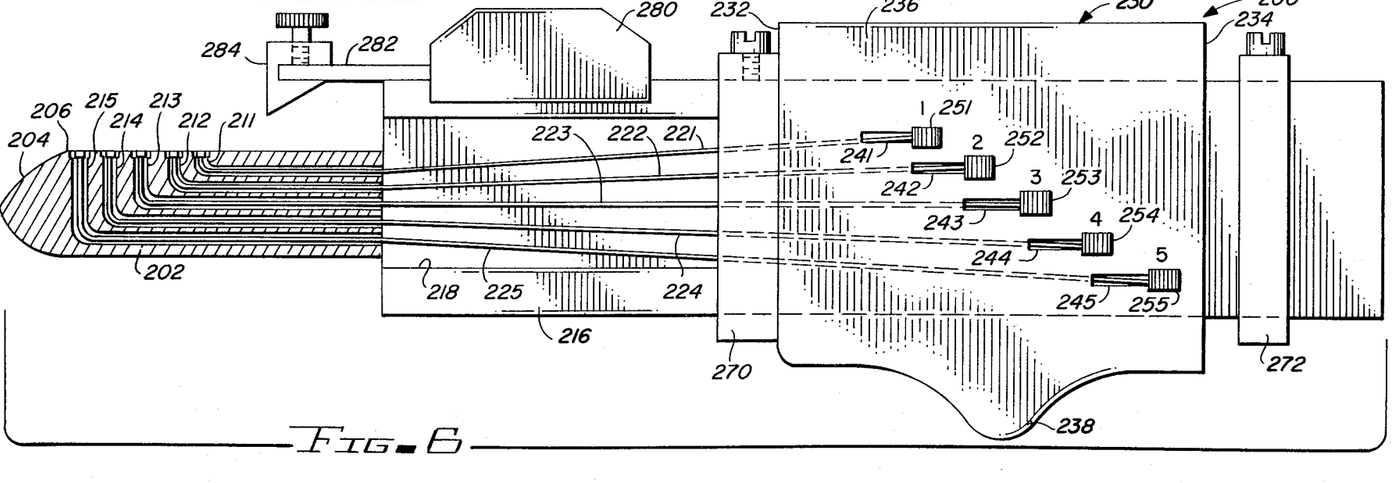
FIG. 6 is a side view of an alternate embodiment of the apparatus of the present invention.

FIG. 6 is a side view, with a portion in partial section, of an alternate embodiment of the apparatus of the present invention. FIG. 6 comprises a side view of a lock picking tool apparatus 200 which embodies the general theory of the locksmith tool apparatus 100 discussed above in conjunction with FIGS. 1–5. The locksmith tool apparatus 200 will be discussed with reference to the lock 8, particularly, as shown in FIGS. 1 and 2.

The lock pick apparatus 200 includes a key blade 202 which is secured to a generally rectangularly configured handle 216. The blade 202 includes a convexly rounded nose 204 which terminates upwardly at a top surface 206 of the blade 202. The overall height of the blade 202 is less than that of the blade 102 of the tool 100. The purpose of the diminished height of the blade 202 is to make certain that the top surface 206 of the blade 202 will be at or below the main key cut 66 of the key way 62, and thus below the lowest portion of each of the lower tumbler pins in the several pin cylinders within the lock 8.

There are five bores extending through the key blade 202 and which terminate at the top surface 206 of the blade. Included are a bore 211, a bore 212, a bore 213, a bore 214, and a bore 215. The terminations of the bores 211 . . . 215 on the top surface 206 of the blade 20 are spaced apart distances equal to the spacing between adjacent tumbler pins in the lock 8.

The handle 216 includes a slot or a groove 218 in which are disposed five wires, including a wire 221, a wire 222, a wire 223, a wire 224, and a wire 225. The wires 221 . . . 225 extend into the respective bores 211 . . . 215. The bores 211 . . . 215 accordingly communicate directly with, and open onto, the groove or slot 218.

An actuator block 230 is disposed on the handle 216 and moves longitudinally thereon. The actuator block 230 is disposed between a pair of stop blocks 270 and 272. The stop block 270 comprises a front stop block and the stop block 272 comprises a rear stop block. The stop blocks 270 and 272 are spaced apart from each other and are appropriately secured to the handle 216 by set screws.

The actuator block 230 is generally of rectangular configuration. It includes a front face 232 which is disposed against the front stop block 270, and a rear face 234 which is spaced apart from the rear stop block 272. The actuator block 230 also includes a side 236.

Spaced apart and staggered with respect to each other on the side 236 of the actuator block 230 are five generally rectangular slots. They include a slot 241, a slot 242, a slot 243, a slot 244, and a slot 245. Five actuator buttons, including an actuator button 251, an actuator button 252, an actuator button 253, an actuator button 254, and an actuator button 255 are disposed respectively in the slots 241 . . . 245. The ends of the wires 221 . . . 225, remote from the termination of the bores 211 . . . 215 at the top surface 206 of the blade 204 extend to the respective buttons 251 . . . 255 and are appropriately secured thereto.

The actuator buttons 251 . . . 255 are shown in their rearmost position in their respective slots 241 . . . 245. The actuator buttons 251 . . . 255 are biased upwardly to lock in place in their respective slots. The buttons accordingly must be depressed, or moved inwardly towards the side 236, to unlock the actuator buttons and thus to move the wires in their respective bores.

Secured to the top of the handle 216, and adjacent to the front portion thereof, is an index block 280. A blade 282 extends outwardly from the block 280. The outer or distal tip of the blade 282 includes an index stop block 284. The blade 282 may be adjustable with respect to the block 280 and the handle 216 for use with different locks.

When the lock pick apparatus 200 is disposed within a key way, such as the key way 62, and with the front face of the index stop block 284 disposed against the front face 58 of the lock apparatus 8, the respective bores 211 . . . 215 are appropriately positioned beneath the corresponding five tumbler pins 44 . . . 52. The wires 221 . . . 225 are then moved with respect to their bores 211 . . . 215 until each of the tumbler pins 44 . . . 52 have been raised in their respective pin cylinders until the compression springs 24 . . . 32 have been compressed to their minimum lengths by the driver pins 34 . . . 42 through the action of the wires on or against the lower pins.

To raise the tumbler pins, the driver pins, and thus to compress the springs, each wire 221 . . . 225 is raised in sequence. The actuator button 251 is first depressed to unlock the button. The button 251 is then moved forwardly in its slot 241. The forward movement of the button 251 causes the wire 221 to move in its bore 211 and against the tumbler pin 44. The upward movement of the wire 221 causes a corresponding movement of the lower pin 44, the driver pin 34, and the spring 224. When the spring 224 is compressed to its minimum length, the upward movement of the wire 221 ceases. The button 251 is then released to lock it in place in the slot 241. With the button 251 locked, the wire 221 maintains its position, thus holding the pins 44 and 34 in position and the spring 24 compressed to its minimum length.

The button 252 is then depressed and moved axially in its slot 252. The movement of the button 252 in turn causes the wire 222 to move relative to its bore 212 and against the tumbler pin 46. The movement of the wire 222 contacts the lower pin 46 and moves it against the driver pin 236 and the driver pin 236 in turn moves against the compression spring 26. When the compression spring 26 is compressed to its minimum length, the forward motion of the button 252 in its slot 242, and of the wire 222, stops. The button 252 is then released, locking it in place in the slot 242. The wire 222 maintains its position in the pin cylinder 76, and the pins 46 and 36, and the spring 26, maintain their respective positions.

The above recited procedure is then continued sequentially with the buttons 253, 254, and 255, and their wires 223, 224, and 225, respectively. The button 253 is moved in its slot 243, causing the wire 223 to move relative to its bore 213 to move the tumbler pin 48 and the driver pin 38 to compress the spring 28. The buttons 254 and 255 are then moved in their slots 244 and 245, to move their wires 224 and 225, respectively, relative to the bores 214 and 215. The lower tumbler pins 50 and 52 are then moved upwardly against the driver pins 40 and 42 and the springs 30 and 32, respectively. When all of the compression springs have been moved to their minimum compressed lengths, the driver pins 34 . . . 42 are then uniformly locked in the respective pin cylinders 14 . . . 22 in the housing 10.

From knowing the minimum compressed lengths of the springs 24 . . . 32 and the lengths of the driver pins 34 . . . 42, and knowing the overall lengths of the respective cylinders 14 . . . 22, the downward distance which the tumbler pins 44 . . . 52 must be moved to arrive at the shear point 70 can be calculated by simple arithmetic calculations. The distance downwardly which the tumbler pins 44 . . . 52 must be moved to bring the tops of the tumbler pins to the shear point 70, and thus the bottom of the driver pins to the shear point, is a simple matter of subtraction. That distance is, of course, known.

With all five of the buttons 251 . . . 255 locked in place relative to their respective slots 241 . . . 245, a rearward movement of the actuator block 230 on the handle 216 will cause a corresponding movement of all of the wires 221 . . . 225. In turn, the various pins and springs will also move a uniform distance.

The distance between the rear face 234 of the actuator 230 and the rear stop block 272 is predetermined or calculated to be the distance which the various pins and springs must move to cause the tumbler pins and driver pins to be at the shear point. When the actuator block 230 is moved rearwardly towards the rear stop block 272 there is a corresponding downward movement of the several pins. When the rear face 234 of the actuator 230 is disposed against the stop block 272, the tops of the tumbler pins and the bottoms of the driver pins are at the shear point.

Rotation of the lock pick apparatus 200 then causes a rotation of the key blade 202 in the key way 62 and a resultant rotation and unlocking of the lock cylinder or plug 60. During the rotation of the lock pin apparatus 200, the wires 221 . . . 225 maintain their positions as locked by their respective buttons 251 . . . 255, thus maintaining the lower pins 44 . . . 52, and consequently the driver pins 34 . . . 42, at the shear point. In this manner the lock apparatus 8 is unlocked by the lock pick tool 200.

The spacing of the rear stop block from the rear face 234 of the actuator block 230 is the predetermined distance which the compression springs and driver pins must move to bring the driver pins to the shear point for a particular lock.

While five discrete bores 211 . . . 215 are shown in the key blade 202, only a single longitudinal bore may be required to house all five wires 221 . . . 225. However, five apertures or top bores extending between the one longitudinal bore and the top surface 206 of the key blade may be required, one for each of the wires, with the appropriate, predetermined spacing between the apertures corresponding with the spacing between the tumbler pins and the pin cylinders.

The lower portion of the actuator block 230 includes a finger stop 238. The finger stop 238 is appropriately configured to receive a user's finger to move the block 230 longitudinally along the handle 216.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Locksmith tool apparatus usable with a lock having a key way, a tumbler pin, a driver pin, and a compression spring biasing the driver pin and the tumbler pin, comprising, in combination:
   key blade means, including a key blade for insertion into the key way of the lock;
   a wire having a tip movably disposed on the key blade means;
   handle means secured to the key blade means;
   indicator means movably disposed on the handle means and secured to the wire for moving the wire to move the tumbler pin and the driver pin to compress the compression spring to a minimum length and to measure the distance moved by the wire to move the pins and compress the compression spring.

2. The apparatus of claim 1 in which the key blade means includes a bore in the key blade adapted to receive the wire.

3. The apparatus of claim 2 in which the handle means includes index means for positioning the bore and the wire beneath the tumbler pin when the key blade of the key blade means is inserted into the key way.

4. The apparatus of claim 3 in which the index means includes a movable blade to allow the key blade to be inserted different distances to index the wire under different tumbler pins.

5. The apparatus of claim 2 in which the key blade of the key blade means includes a top surface disposed adjacent to the tumbler pins of the lock, and the bore communicates with the top surface.

6. The apparatus of claim 5 in which the handle means includes a stop block, and the indicator means is disposed against the stop block when the tip of the wire is at the top surface of the key blade.

7. The apparatus of claim 6 in which the indicator means includes means for indicating the distance the indicator means moves relative to the handle means to move the wire to move the tumbler and driver pins to compress the compression spring to its minimum length.

8. Locksmith tool apparatus usable in a lock having a plurality of tumbler pins, driver pins, compression springs, and a key way communicating with the tumbler pins, and each compression spring biases a driver pin and a tumbler pin against the key way, comprising, in combination:

key blade means insertable into the key way:
handle means secured to the key blade means;
block means movable on the handle means;
wire means secured to the block means and movable therewith and extending to the key blade means for moving tumbler pins, driver pins, and compression springs to compress the compression springs to minimum length when the key blade means is inserted into the key way.

9. The apparatus of claim 8 in which the key blade means includes a top surface, and the wire means communicates with the top surface and moves relative thereto to move the tumbler pins, the driver pins, and the compression springs.

10. The apparatus of claim 9 in which the handle means includes index means for indexing the wire means beneath each tumbler pin of the plurality of tumbler pins.

11. The apparatus of claim 10 in which the index means includes a blade movable to allow the key blade means to be inserted varying distances into the key way.

12. The apparatus of claim 11 in which the key blade means includes a bore communicating with the top surface, and the wire means includes a wire disposed in the bore and movable relative to the bore and to the top surface when the block means is moved on the handle means to move a tumbler pin, a driver pin, and a compression spring.

13. The apparatus of claim 12 in which the block means includes indicator means for indicating the distance moved by the block means and the wire means in moving a tumbler pin and a driver pin to compress a compression spring.

14. The apparatus of claim 8 in which the wire means includes a plurality of wires movable relative to each other and to the block means to move the plurality of tumbler pins, and driver pins to compress the plurality of compression springs to their minimum lengths.

15. The apparatus of claim 14 in which the key blade means includes a top surface and a plurality of bores communicating with the top surface for receiving the plurality of wires of the wire means.

16. The apparatus of claim 15 in which the plurality of bores are spaced apart a distance corresponding to the spacing between each tumbler pin of the plurality of tumbler pins for moving all of the pins and compression springs by moving each wire of the wire means.

17. The apparatus of claim 16 in which handle means includes first stop means for limiting the movement of the block means in a first direction and second stop means for limiting the movement of the block means in a second direction.

18. The apparatus of claim 17 in which the block means is disposed against the first stop means before moving the wires of the wire means to move the plurality of pins and compression springs, and the block means is moved on the handle means to the second stop means after the plurality of wires have been moved to compress the plurality of compression springs to allow each compression spring to expand a predetermined amount and to thereby move the driver pins and the tumbler pins by the same amount.

* * * * *